United States Patent [19]

Waite

[11] 4,422,655

[45] Dec. 27, 1983

[54] CHUCK WITH IMPROVED JAW ACTUATOR SUPPORT STRUCTURE

[75] Inventor: Carlson A. Waite, Bear Lake, Mich.

[73] Assignee: Sheffer Collet Company, Traverse City, Mich.

[21] Appl. No.: 295,772

[22] Filed: Aug. 24, 1981

[51] Int. Cl.³ .................. B23B 5/34; B25G 3/22
[52] U.S. Cl. .................. 279/118; 279/119
[58] Field of Search .............. 279/76, 117, 118, 119, 279/120, 121, 110

[56] References Cited

U.S. PATENT DOCUMENTS

| | | | |
|---|---|---|---|
| 2,422,785 | 6/1947 | Johnson | 279/119 |
| 2,729,459 | 1/1956 | Leifer | 279/119 |
| 2,814,496 | 11/1957 | Damijonaitis | 279/119 |
| 3,085,813 | 4/1963 | Sampson | 279/119 |
| 3,797,837 | 3/1974 | Roddy et al. | 279/118 |

Primary Examiner—E. R. Kazenske
Assistant Examiner—Paul M. Heyrana, Sr.
Attorney, Agent, or Firm—Price, Heneveld

[57] ABSTRACT

A chuck for heavy duty applications has a plurality of radially slidable jaw mounts each actuated by an L-shaped lever mounted for rocking motion about a supporting trunnion. The levers each have a leg engaging one of the jaw mounts and another engaging an actuator. An external lubricant receiving port is provided adjacent each trunnion and a multiple conduit lubricant distribution system is provided extending through the supporting trunnion and actuating lever. The chuck body also has a lubricant flow channel through which lubricant flows circumferentially of the chuck to assure uniform distribution, eliminating lubricant concentrations and eccentric weight distribution in the chuck.

1 Claim, 8 Drawing Figures

CHUCK WITH IMPROVED JAW ACTUATOR SUPPORT STRUCTURE

FIELD OF THE INVENTION

This invention relates to an improvement in chucks and particularly chucks for heavy duty, high speed operation. The type of chuck involved is one having a body in which there are a plurality of radially slidable jaw supports, a central, axially movable actuator and a plurality of levers, each one of which engages one of the jaw supports and the actuator and is rocked about a pin as the actuator moves to shift the jaw inwardly and outwardly. The invention provides an improvement in the lubrication of the working parts of the chuck.

BACKGROUND OF THE INVENTION

Chucks of the type to which this invention is directed have a number of internal moving parts which serve to open and close the jaws. The operation of these parts is most important to assure that there is a positive clamping of the workpiece when the jaws are closed and further that each of the jaws applies equal pressure against the workpiece to prevent distortion and possible eccentric location of the workpiece. At the speeds at which many chucks are used in modern manufacturing processes, even slight eccentricity can be quite serious from both a safety point of view and from the point of view of wear and early failure of the equipment. It also is likely to cause improper machining requiring rejection of the workpiece. In this connection, it is important that the moving parts which control the movement of the jaws be properly lubricated. It is necessary to assure adequate lubrication of each bearing point between the parts. This is necessary both to assure proper actuation and to reduce wear.

In doing this there will be a certain amount of lubricant which becomes discharged from the moving parts into the interior of the chuck body and collects within the body. In prior constructions, not only has it not been possible to assure lubrication of all of the critical points in the chuck actuating system, there has also been the problem of the excess lubricant collecting in certain areas of the chuck in such amounts that significant weight imbalance is generated by the lubricant's presence. Further, this accumulation of lubricant will occur at the outermost portion of the interior of the chuck because of the centrifugal forces acting upon it during chuck operation. This situation creates undesirable and, in some cases, unacceptable eccentricity of the chuck.

BRIEF DESCRIPTION OF THE INVENTION

The invention provides a lubricant port on the exterior of the chuck adjacent each of the jaw operating mechanisms. Within the jaw and its mounting structure, a network of distribution channels and openings are provided whereby lubricant introduced at the port is permitted to migrate to all of the wear points of the jaw operating mechanism. All of the operating mechanisms can thus be lubricated within the sealed interior of the chuck body without the necessity of either disassembling or opening the chuck. At the same time, if excessive amounts of lubricant are present adjacent any one of the jaws, a peripheral distribution channel is provided through which lubricant migrates permitting it to become uniformly distributed around the entire circumference of the interior of the chuck body. This automatically prevents the build up of any eccentric weight distributions within the chuck.

DESCRIPTION OF THE PREFERRED EMBODIMENT

Figure 1:
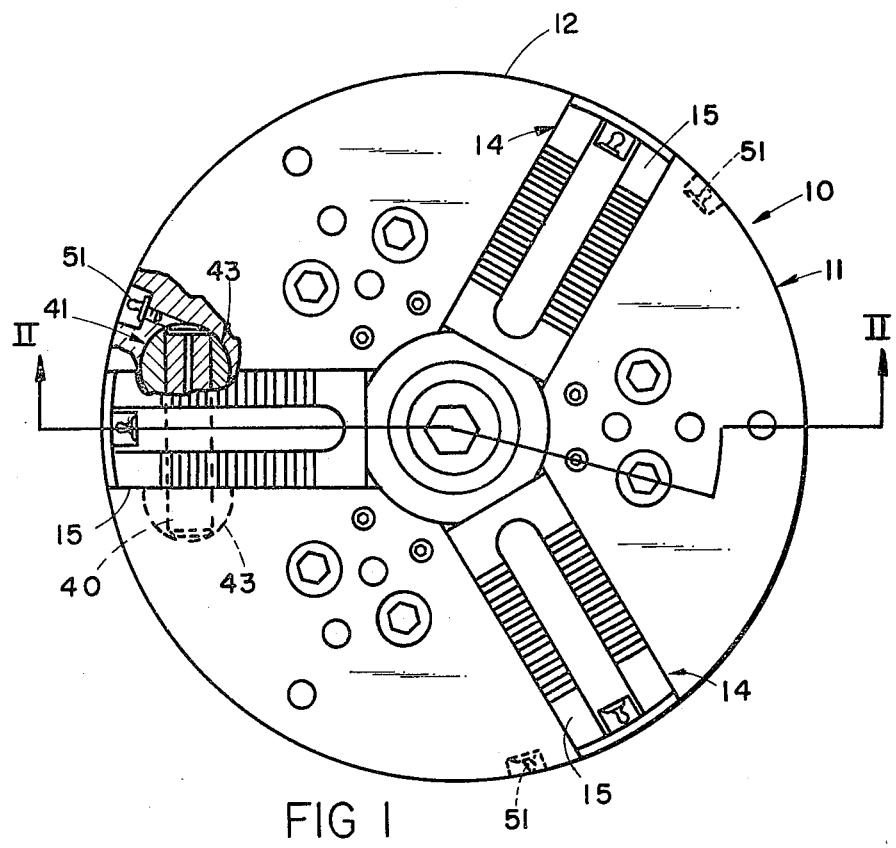
FIG. 1 is a front view, partially broken, of a chuck incorporating this invention.

The numeral 10 indicates a chuck having a body 11 having as its primary portions a forward body member 12 and a rear closure plate 13. The forward body member has a plurality of radially extending slots 14 opening through its forward face. In the particular construction illustrated, three slots are provided but it will be recognized that a greater or lesser number can be used depending upon the size and the type of service for which the chuck is designed. Mounted in each of the slots 14 is a radially slidable jaw support 15. The central portion of the chuck has a concentric opening 20 extending through the rear closure plate 13. The opening 20 provides access for the coupling 21 for an actuator rod. The coupling connects to the actuator 23 which is mounted for sliding axial movement within the chuck body. The actuator 23 has a circumferential slot 24. The forward end of the opening 20 is closed and sealed by a suitable plate or cover illustration of which is omitted. This is conventional practice to prevent the entry of chips and dirt.

The axial movement of the actuator 23 is transmitted to each of the jaw supports 15 by means of pivoted levers 30. Each lever is generally L-shaped having one leg 31 projecting forwardly and engaging in a pocket 32 in one of the jaw supports 15. A substantially longer leg 33 extends radially inwardly with its inner end seated in the slot 24 in the actuator. Rotation of the actuator 24 with respect to the levers 30 is prevented by means of guide pins 34, one on each side of each lever (FIGS. 2 and 4).

Figure 2:
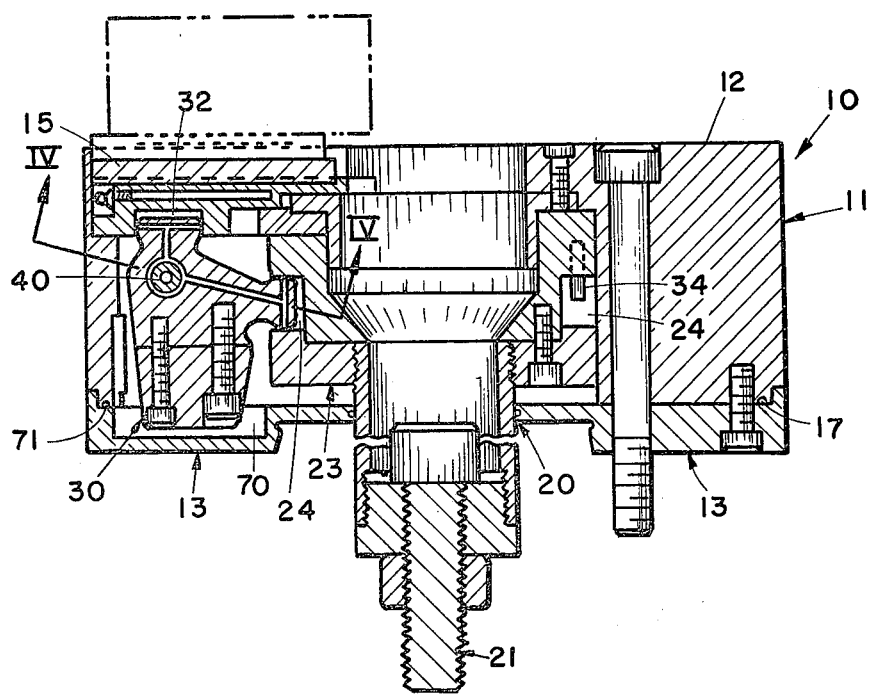
FIG. 2 is a sectional elevation view taken along the plane II—II of FIG. 1.
Figure 3:
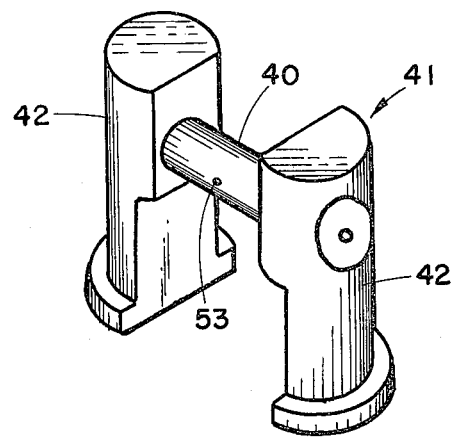
FIG. 3 is an oblique view of the jaw operating lever supporting trunnion.
Figure 6:
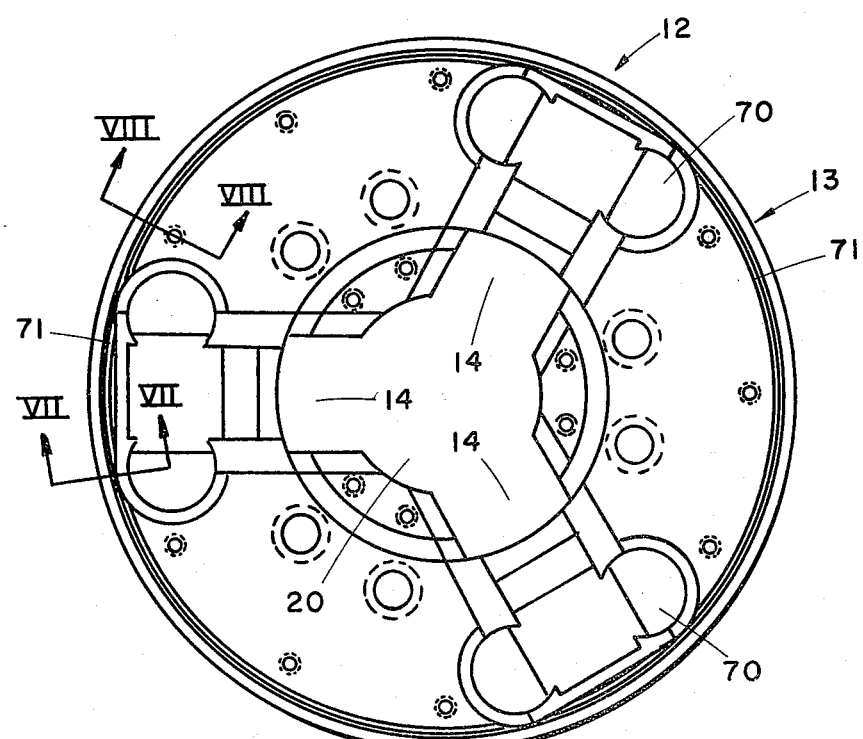
FIG. 6 is a rear view of the front plate for the chuck body illustrating the lubricant migration channel.
Figure 5:
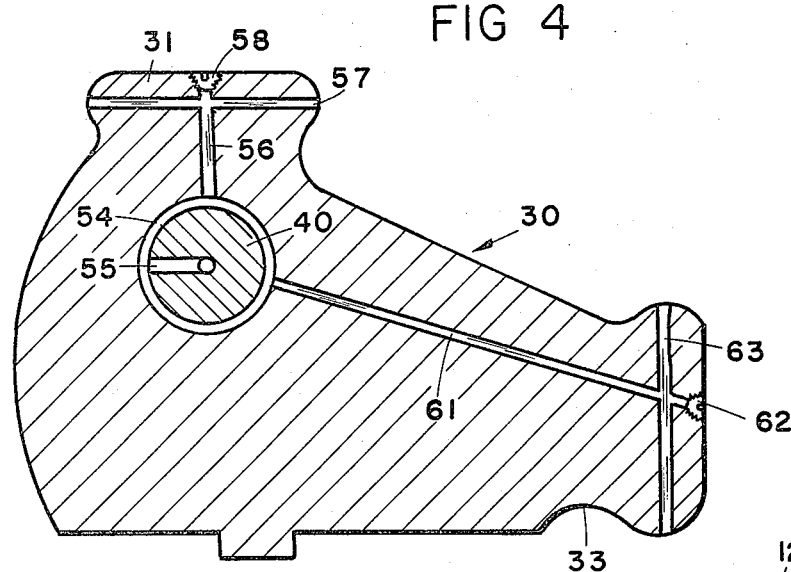
FIG. 5 is a sectional view of the jaw support operating lever taken along the plane V—V of FIG. 4.

As best seen in FIGS. 2, 3 and 5, each of the levers is pivotally supported by a pin 40 which itself is part of a trunnion assembly 41. The trunnion assembly includes a pair of posts 42, one on each side of each lever. The posts 42 are seated in suitable, vertical holes 43 in the forward body member 12. The posts support the pivot pin 40 which extends through the lever 30 and it is about this pin that the lever pivots. To this point, the structure which has been described is conventional and has been used in existing chucks.

Figure 4:
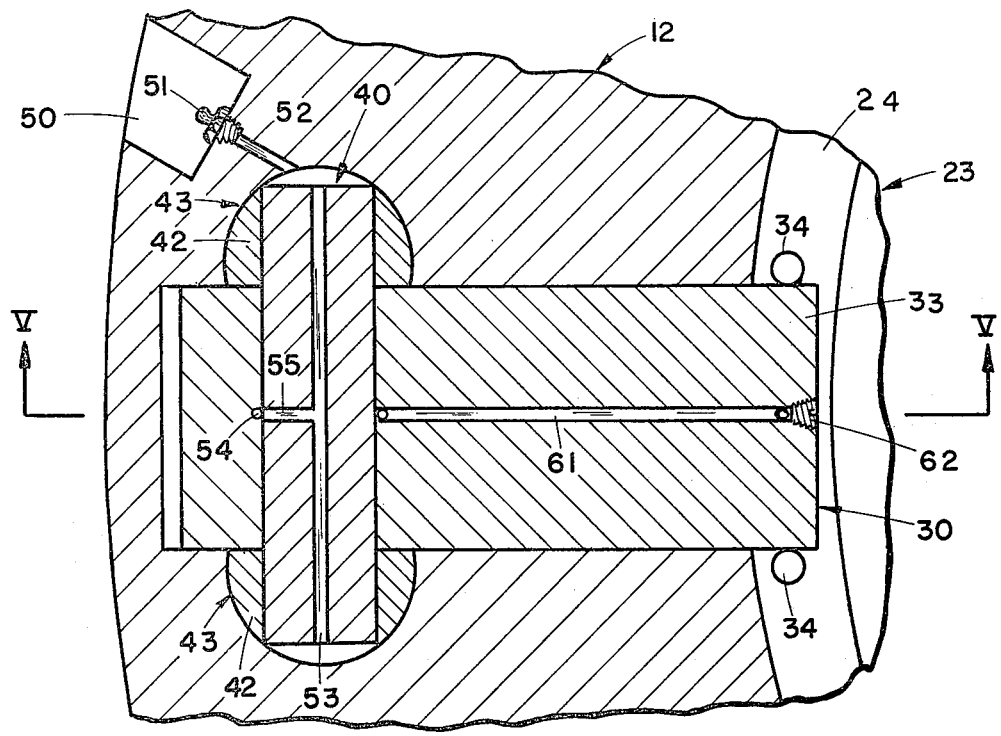
FIG. 4 is an enlarged, fragmentary sectional view taken along the plane IV—IV of FIG. 2.

To provide appropriate lubrication for the lever 30 and the connections between the lever and the jaw support 15 and the actuator 23, a source of lubricant is provided in the form of a lubricant inlet port 50 equipped with a Zerkes fitting 51 recessed into the outer face of the chuck (FIG. 4). This type of fitting is proper since the lubricant is a grease. The inlet port includes a passage 52 which communicates with the opening 43 at the end of the pin 44. The pin 44 in turn has an axially extending central opening 53 extending its full length. Thus, lubricant from the port 50 can pass the length of the pin, lubricating the pin at both of the posts of the trunnion. Midway between the ends of the pin, a channel 54 is provided in the wall of the opening in which the pin is seated. The channel 54 extends entirely around the pin, and, at one point, is connected to the central opening 53 by a branch opening 55. As best seen in FIG. 5, the channel 54 connects with a distribution passageway 56 which extends forwardly through the short leg 31 and communicates with a cross channel 57 in the head of the leg and discharges at opposite ends at the head where it engages the walls of the pocket 32 when the lever is shifting the jaw support. The end of the channel 56 is closed by a suitable plug 58.

A secondary channel 61 extends along the center of the longer leg to the end of the lever which engages the actuator 23 and there is closed off by a suitable plug 62. This channel also communicates with a distribution channel 63 through which the grease is discharged at the points where the head of the leg engages the walls of the slot 24 in the actuator 23. It will be seen from this arrangement that grease introduced through the single inlet port 50 will be distributed to all wear points of the lever.

Some of the grease that passes through the lever structure to lubricate its points of contact with both the jaw support and the actuator will ultimately migrate from the film forming area where the parts are in contact with other structure and thus will become accumulated in the pocket 70 within the housing or body of the chuck. Because of centrifugal forces acting upon the chuck, this grease-type lubricant will accumulate at the radial, outer periphery of the pocket 70. Inasmuch as the chucks are lubricated without the precise care of exactly balancing the exact amount of lubricant introduced through each lubricant port, the quantity of lubricant accumulating in each of the pockets 70 may vary substantially over a period of time. The result of such accumulations is a definite tendency to accumulate more grease in one of the pockets with respect to the amount accumulated in other pockets. This distorts the weight distribution within the chuck. While in low speed chucks this may not be a problem, when the operating speeds of the chucks are increased, this rapidly begins to take on significance and ultimately becomes a serious problem because the weight of the chuck is eccentric. This results in vibration and bearing wear.

Figure 7:
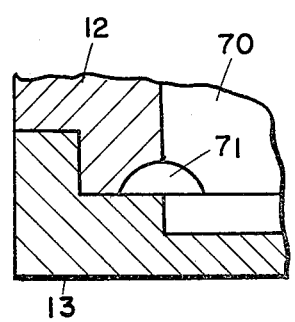
FIG. 7 is an enlarged, fragmentary sectional view taken along the plane VII—VII of FIG. 6.
Figure 8:
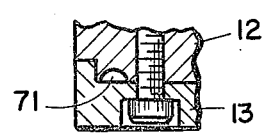
FIG. 8 is an enlarged, fragmentary sectional view taken along the plane VIII—VIII of FIG. 6.

To prevent this condition from occurring, a circumferential channel 71 is provided in the back face of the forward body portion. The open face of the channel extends through the rear face and throughout a substantial portin of the circumference of the housing is closed by the rear closure plate 13 (FIGS. 2 and 8). However, the channel's location is such that it intersects each of the pockets 70 (FIG. 7). This any excessive amount of grease accumulating in any one of the pockets will be caused to migrate along the channel 71 due to the rapid rotation of the chuck. As a result of this freedom to migrate, the grease will automatically become equally distributed all the way around the chuck thus automatically and continuously eliminating grease concentrations and eccentric weight distribution. This is important in maintaining accurate operation of the chuck. It will be recognized that the pockets 70 can be interconnected by an opening other than the specific channel described so long as it is located adjacent the outer radial periphery of the pockets where the grease accumulates as a result of the centrifugal action of the chuck.

It will be seen from the above description that this invention provides a chuck which can be quickly and easily fully lubricated simply by applying lubricant to the lubricant port at each of the jaws with the design of the chuck assuring distribution of the grease to all points where lubrication is necessary. At the same time uniform grease distribution throughout the chuck is assured without the necessity of an operator having to either precisely measure the quantity of grease applied or to open the chuck body. This arrangement improves the life and accuracy of the chuck and also protects the chuck against the potential injury which could occur if chips and other materials were permitted to have access to the chuck's interior.

Having described a preferred embodiment of the invention, it will be recognized that modifications of the invention can be made without departing from the principles of the invention. Such modifications are to be considered as included in the hereinafter appended claims unless these claims by their language expressly state otherwise.

The embodiments of the invention in which an exclusive property or privilege is claimed are defined as follows:

1. In a chuck having a main body member, a plurality of radially extending slots therein opening through the front face thereof, a base for a jaw slidably seated in each of said slots, a plurality of L-shaped levers, each having one leg engaging one of said jaw bases, individual trunnion means mounting each lever; an actuator mounted concentrically of said body member for axial movement and engaging the other leg of each of said levers; each trunnion means having a pair of circumferentially spaced posts with one of said levers being seated between them; a pivot pin extending through each pair of said posts and said lever for supporting the lever for radial rocking movement, a central opening extending lengthwise through said pin and a circumferential channel in said lever surrounding said pin and lubricant conduit means communicating with both said opening and said channel, said chuck characterized in that secondary lubricant conduits extend lengthwise of both legs of each lever and discharge through the ends of each lever engaging said actuator and a jaw base; a lubricant receiving port communicating with one end of said opening in said pin; said main body member having a plurality of pockets, each housing one of said levers and trunnion means; a circumferential channel in the rear of said body adjacent the circumferential periphery thereof communicating with and providing the only interconnection between said pockets adjacent the outer radial periphery thereof whereby lubricant accumulating in said pockets may migrate between the pockets to automatically and uniformly distribute the lubricant between the pockets due to centrifugal forces incident to use of the chuck.

* * * * *